Patented Nov. 16, 1943

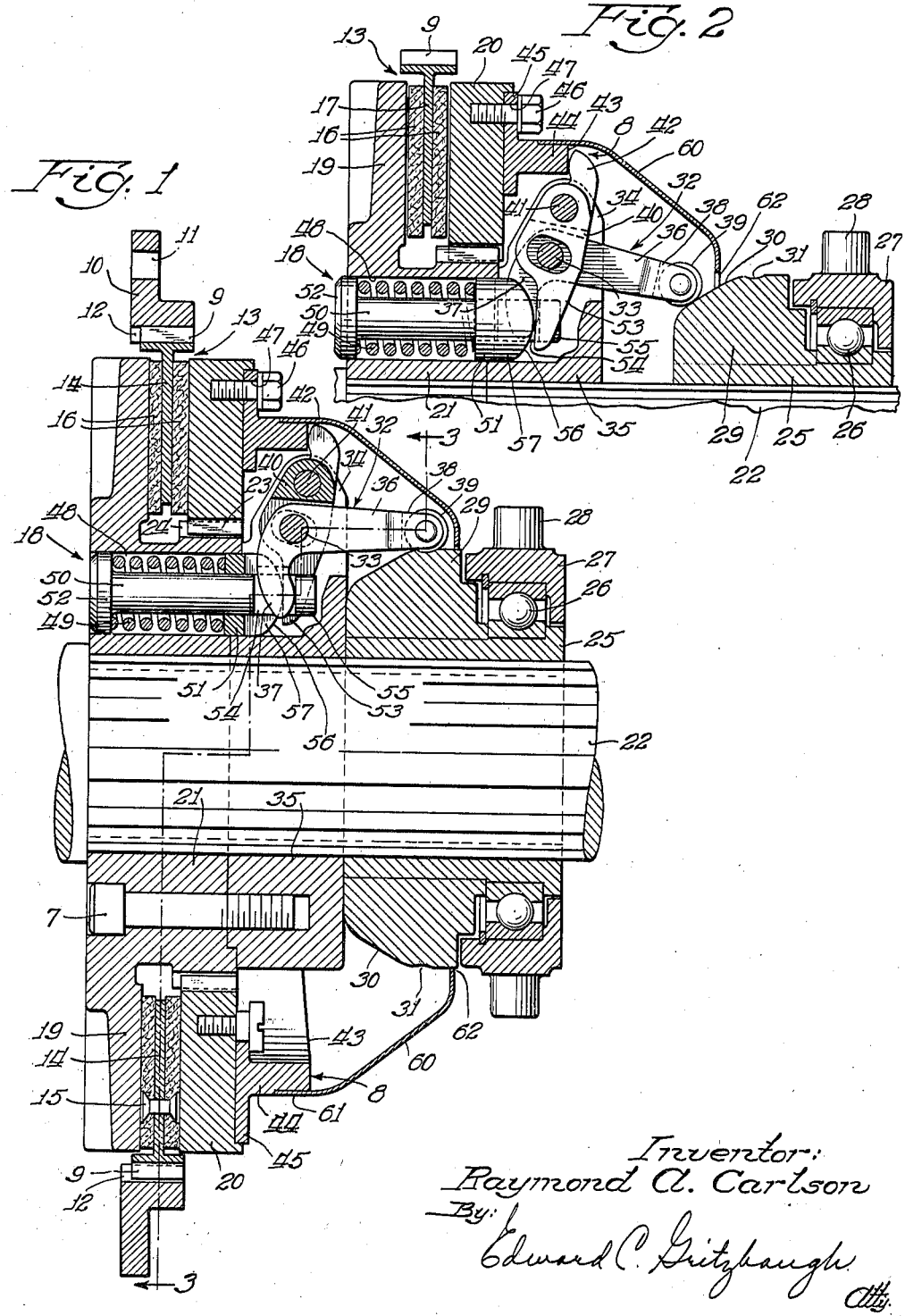

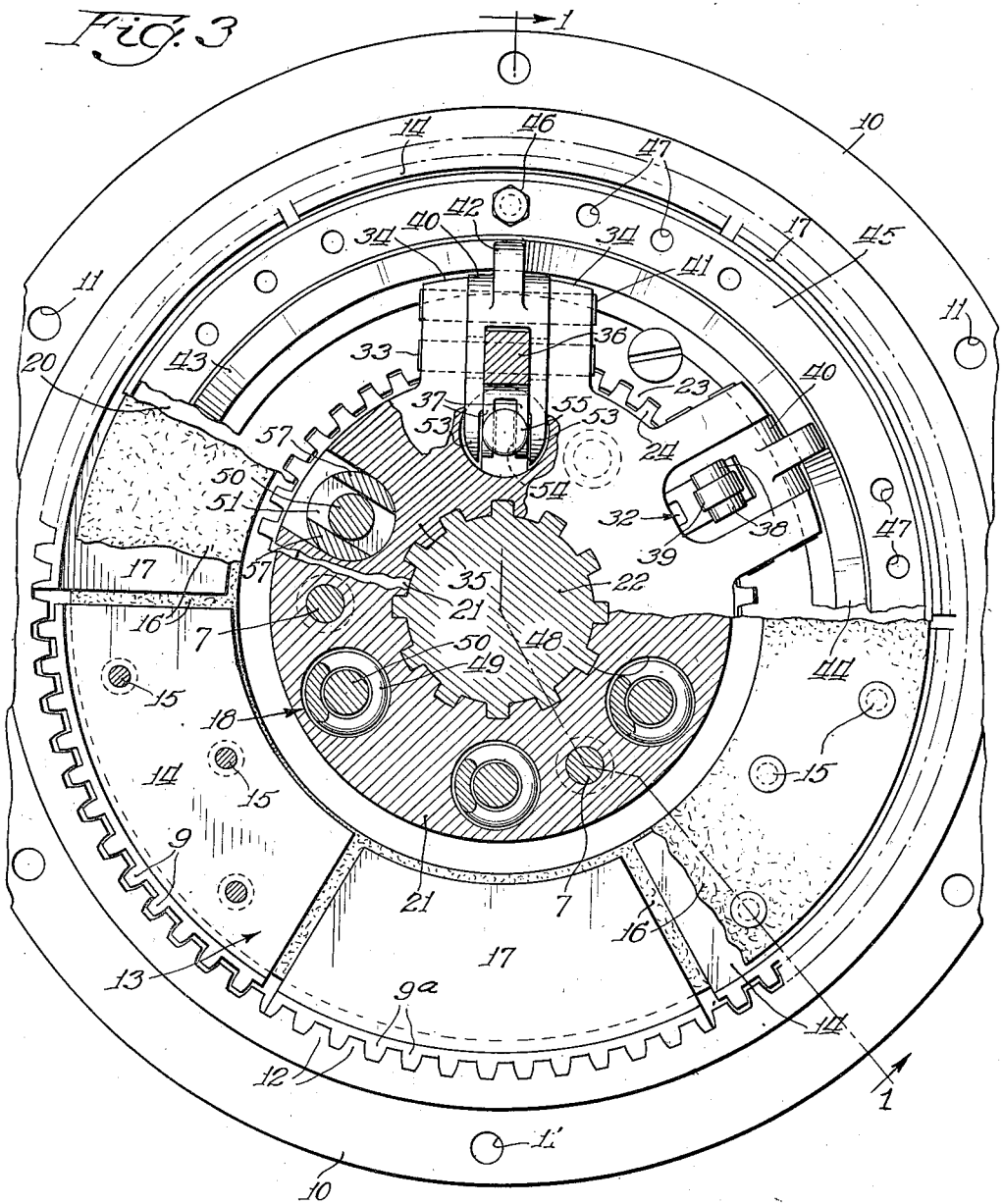

2,334,382

UNITED STATES PATENT OFFICE 2,334,382

FRICTION CLUTCH

Raymond A. Carlson, Rockford, Ill., assignor to Borg-Warner Corporation, Chicago, Ill., a corporation of Illinois Application February 14, 1941, Serial No. 378,848

15 Claims. (Cl. 192—68)

This invention relates to friction clutches and has as its primary object to provide a friction clutch wherein facing wear is compensated for, within a limited range, by automatic adjustment within linkage which transmits clutch operating pressure from an operating member to the clutching elements and wherein the clutch engaging pressure is maintained at a substantially uniform maximum through such automatic adjustment.

The invention further contemplates provision of supplemental adjustment means whereby periodical adjustment may be effected manually to extend the range of automatic adjustment provided in the linkage.

The invention contemplates specifically the provision of such adjusting mechanism in a clutch of the type wherein clutch engagement is effected by advancing an operating member against a plurality of engagement levers which in turn transmit the pressure to one of the clutching elements while reacting against another of the clutching elements.

The invention further contemplates the utilization of the above described characteristics in a clutch of the type wherein the driving element is in the form of an annular facing carrying member and the driven elements are in the form of a pair of opposed annular members embracing and adapted to engage the facings of the driving member, one of the driven elements being fixed to the driven shaft and the other being drivingly connected thereto and axially shiftable to effect clutch engagement.

A further object of the invention is to provide a clutch which in addition to the above noted characteristics, is of relatively simple and compact construction.

Other objects, the advantages and uses of the invention will become more apparent after reading the following specification and claims, and after consideration of the drawings forming a part of the specification, wherein:

Fig. 1 is an axial sectional view of a clutch embodying my invention, the clutch being shown in engaged relation;

Fig. 2 is an axial sectional view showing the clutch disengaged; and

Fig. 3 is a transverse sectional view of the clutch, taken on the line 3—3 of Fig. 1.

As an example of one form in which the invention may be embodied, I have shown in the drawings a clutch of the heavy duty industrial type, including a drive transmitting member 10 having openings 11 by means of which it may be attached to a driving member such as for example, a flywheel, and having internal teeth 12 for transmitting drive to a driving clutch element indicated generally at 13. The driving element 13 includes a plurality of circumferentially separated facing supporting segments 14 to which are secured as by means of rivets 15, a pair of embracing facings 16 of suitable frictional material. Interposed between the segments 14 are a plurality of loose segments 17 of substantially the same thickness as the segments 14 so as to cooperate with the segments 14 in maintaining the facings 16 in parallel planes while taking the pressure of clutch engagement. The segments 17 are confined between the facings 16, the segments 14, and the drive ring 10.

The segments 14 and 17 are provided with peripheral teeth 9 and 9a respectively meshing with the internal teeth 12 of the drive ring 10. The teeth on the loose segments 17 are adapted to snugly engage the teeth 12 under the effect of centrifugal force, so as to take up the backlash between the facings and the drive ring 10.

The facings 16 are adapted to be engaged between a pair of driven elements 19 and 20, the element 19 having a hub portion 21 which is splined upon a driven shaft 22 and the element 20 having internal teeth 23 meshing with splines 24 on the hub portion 21 so as to be drivingly connected thereto while capable of axial shifting movement to permit clutch engagement.

Mounted on the shaft 22 for axial shifting movement is a sleeve 25 which is connected through the medium of an end thrust bearing 26 with a collar 27 having trunnions 28 adapted to coact with a shifting fork of conventional design. Secured upon the sleeve 25 is an operating cam ring 29 having a frusto-conical cam surface 30 terminating in a reentrant locking groove 31.

Linkage for transmitting clutch operating movement from the cam 29 to the driven clutching elements 19 and 20, includes a plurality of levers 32 each fulcrumed on a pivot pin 33 mounted between a pair of ears 34 of a fulcrum member 35 which is fixedly associated with the driven element 19 and shaft 22 as for example, by means of the machine screws 7 securing it to the driven element 19. The levers 32 are in the form of bell cranks, each including an arm 36 extending in a generally axial direction and an arm 37 extending radially inwardly. The arm 36 is formed at its end with a fork 38 in which is journalled a roller 39 adapted to coact with the cam face 30.

The transmitting linkage further includes manual adjustment means, indicated generally at 8, and resilient transmission links, indicated generally at 18, both interposed in series with each other between the levers 32 and the driven element 20.

The adjustment means 8 comprises an adjusting cam ring 44 and a plurality of levers 40, the ring 44 being carried by the driven element 20 and the levers 40 being operatively interposed between the ring 44 and the resilient link 18. The levers 40 are embraced between the ears 34 of the fulcrum member and are fulcrumed on pivot pins 41 mounted in the ears 34 outwardly of the levers 32. The inner arms of the levers 40 are bifurcated to provide spaced furcations 53 which embrace the levers 32. The outer arms 42 of the levers 40 are engaged against cam surfaces 43 on the adjusting ring 44. The ring 44 has a flange 45 which is secured against the rear face of the driven element 20 by means of screws 46. The screws 46 extend through openings 47 in the flange 45 and may be removed to permit the ring 44 to be rotated with reference to the driven element 20 and reinserted through different openings 47.

The resilient links 18 are mounted in axially extending cylindrical bores 48 in the hub portion 21 of the driven element 19. Each link 18 includes a coil spring 49, a draw bolt 50 and a washer 51, the spring 49 being engaged between the washer 51 and a head 52 on one end of the draw bolt 50. The head 52 and washer 51 are fitted loosely in the bore 48 so as to be axially slidable therein.

The resilient links are each operatively interposed between an arm 37 of a lever 32 and the furcations 53 of the corresponding lever 40. The arm 37 has at its end a fork embracing the bolt 50, received in notches 54 formed in the sides of the bolt, and acting against a head 55 defining one extremity of the respective notches 54. The furcations 53 of the lever 40 are engaged against arcuate end surfaces 56 of a pair of wings 57 formed on the washer 51.

Rotation of the adjustment ring 44 with reference to the driven element 20 causes the levers 40 to be adjusted in a clockwise direction around their pivots 41, the furcations 53 moving to the left and compressing the springs 49.

The cam ring 44 forms a support for a clutch cover 60 which has a ring 61 snugly fitted on the periphery of the cam ring 44 and tapers rearwardly and inwardly to an opening 62 which receives the operating member 21.

In the operation of the clutch, assuming it to be in disengaged position as shown in Fig. 2, the rotation of torque transmitting ring 10 by the power source as contemplated will result in the free arcuate segments 17 being moved radially outwardly bringing the teeth 9a thereof into close engagement with the opposed teeth 12 of the torque ring 10. The movement of operating cam 29 to the left in Fig. 2 will cause the rollers 39 to ride radially outwardly against the cam face 30, in turn causing the levers 32 to pivot in a counterclockwise direction about their fulcrum pivots 33. The arms 37 of the levers 32 will swing to the right as viewed in the drawings, drawing the bolts 50 to the right, and transferring movement through the coil springs 49 and the washers 51, to the adjustment levers 40, causing the latter to swing in a counterclockwise direction. The outer arms 42 of the levers 40, bearing against the cam ring 44, transmit the movement to the driven element 20, advancing the latter to effect clutch engagement. The reaction is transmitted from the levers 32 to the pivots 33, thence to the fulcrum member 35 and the driven element 19. Thus the two driven elements are drawn together into clutching engagement with the drive element 13. As engagement is attained, the spring 49 will yield, and thus the engaging pressure is fixed at a maximum determined by the spring load.

The cam surface 30 of the operating member provides for considerably more movement of the levers 32 than is necessary for advancing the driven elements into engagement with the drive element. The surplus movement is absorbed in the compression of the spring 49. This surplus movement is utilized to take up slack in the linkage that would otherwise be occasioned by wearing down of the facings. Thus the yielding transmission links 18 provide for automatic adjustment for facing wear within a limited range. When this range of adjustment has been exhausted, it may be extended by manually adjusting the cam ring 44. Within the new range of adjustment thus provided, the linkage will continue to provide automatic adjustment for further facing wear.

The invention provides an arrangement which is very compact. The resilient transmission elements are accommodated within the hub of the driven element 19. The levers 32 are partially nested in the levers 40.

I claim:

1. In a friction clutch, driving and driven friction clutching elements, a shaft on which one of said elements is mounted, fulcrum means fixedly associated with said shaft, an annular operating cam encircling and axially slidable with reference to the shaft adjacent said fulcrum means, and linkage for transferring clutch engaging pressure from said cam to said clutching elements, said linkage comprising a plurality of bell-crank levers, fulcrumed on said fulcrum means, each having an axially extending arm coacting with said cam and an arm extending radially inwardly, adjustment means including an adjustment lever associated with each of said bell-crank levers and fulcrumed on said fulcrum means, an annular adjusting cam secured to said one clutching element for rotatable adjustment relative thereto and having cam portions coacting with the outer arms of the respective adjustment levers, and resilient elements interposed between the inner arms of the respective adjustment levers and said inwardly extending arms of the bell-crank levers, said resilient means being adapted to transmit clutch engaging pressure from the bell-crank levers to the adjustment levers at a maximum limit predetermined by said resilient means and to automatically compensate within a limited range, for wear between the clutching elements, said adjustment means being adapted to extend the range of automatic take-up provided by said resilient means.

2. In a friction clutch, a clutching element having facings, a pair of clutching elements embracing and adapted to clutchingly engage said facings, one of said pair of elements having a hub portion and the other having a driving connection with said hub portion permitting axial movement thereof for effecting clutch engagement, a shaft on which said hub portion is fixed, an axially movable annular operating member, fulcrum means interposed between said operating member and said clutching elements, and fixedly associated with said fixed clutching element, said fulcrum means comprising pairs of circumferentially spaced ears, and linkage for transmitting clutch operating movement from said operating member to said movable clutching element, said linkage comprising bell-crank levers pivoted between said ears, having axially projecting arms cooperating with said operating member and having inwardly projecting arms, resilient transmitting links coacting with said inwardly extending arms and operatively interposed between said bell-crank levers and said movable clutching element, said resilient links being accommodated largely within the confines of said hub, and levers operatively interposed between said resilient links and said movable clutching element, said last mentioned levers having bifurcated inner arms embracing portions of said bell-crank levers and in turn embraced between said ears.

3. In a friction clutch, a clutching element provided with a pair of facings, a pair of clutching elements embracing and adapted to clutchingly engage said facings, one of said pair of clutching elements including a hub portion, a shaft on which said hub portion is mounted, the third clutching element being axially movable with reference to the shaft, an axially shiftable operating member, said hub having a plurality of axially extending bores, and linkage for transferring clutch engaging pressure from said operating member to said clutching elements, said linkage comprising a plurality of operating levers fulcrumed with reference to the shaft and each having one arm arranged to be acted upon by said operating member, and another arm extending radially inwardly from its fulcrum, coil springs in each of said bores, a plunger extending through each of said coil springs having at one end a draft connection with an inwardly projecting arm of a corresponding lever and having at its other end means providing an abutment engaged against an end of said coil spring, and a plurality of levers fulcrumed with reference to said shaft and each having a radially inwardly extending arm arranged to receive clutch engaging pressure from the other end of said coil spring and an outer arm arranged to transmit such pressure to the said third clutching element.

4. A friction clutch as defined in claim 3, including adjustment means interposed between said outer arms and said third clutching element, said coil spring being adapted to automatically take up, within a limited range, the slack in the linkage tending to develop as a result of facing wear and said adjustment means being adapted to extend the range of such automatic take up.

5. In a friction clutch, a clutching element, facings carried thereby, a pair of clutching elements embracing and adapted to clutchingly engage said facings, one of said pair of elements having a hub portion having external teeth, a shaft on which said hub portion is fixed, the other of said pair of elements being in the form of a ring having internal teeth meshing with said external teeth and permitting axial shift of said other element for effecting clutch engagement, an axially movable operating member, and linkage for transferring clutch engaging pressure from said operating member to said pair of clutching elements, said linkage comprising a plurality of levers fulcrumed with reference to the shaft and each having an arm arranged to be acted upon by said operating member, a plurality of resilient elements confined in said hub and arranged to receive clutch engaging pressure from said levers, and a plurality of generally radially extending levers fulcrumed with reference to the shaft and arranged to receive the clutch engaging pressure from said resilient elements and to transmit such pressure to said other clutching element.

6. A friction clutch as defined in claim 5, including adjustment means interposed between said levers and said other clutching elements, said resilient means being adapted to automatically take up, within a limited range, slack tending to be developed in the linkage as a result of facing wear, while maintaining a substantially constant maximum limit upon the pressure transmitted through the linkage, and said adjustment means functioning to extend the range of an automatic take up provided by said resilient means.

7. In a friction clutch, driving and driven friction clutching elements, a shaft on which one of said elements is mounted, fulcrum means fixedly associated with said shaft, an annular operating member encircling and axially slidable with reference to the shaft, and linkage for transferring clutch engaging pressure from said operating member to said one clutching element, said linkage providing a plurality of bell crank levers fulcrumed on said fulcrum means, each having an axially extending arm coacting with said operating member and an arm extending radially inwardly, adjustment means including an adjustment lever associated with each of said bell crank levers and fulcrumed on said fulcrum means, the inner regions of said adjustment levers being substantially aligned with said inwardly extending bell crank arms, means transmitting movement between said inner ends of the adjustment levers and said inwardly extending bell crank arms, the outer arms of said adjustment levers extending radially beyond the bell crank levers, and an annular adjusting cam secured to said one clutching element for rotatable adjustment relative thereto and having cam portions coacting with said outer arms of the adjustment levers.

8. In a friction clutch, a pair of clutch elements and a third clutch element frictionally engageable between said pair of clutch elements, an axially shiftable operating member, and means for transmitting clutch engaging pressure from said operating member to said pair of clutch elements, said means comprising a fulcrum member arranged to transmit pressure to one of said pair of elements, a first and second series of lever members, and resilient means adapted to permit the operating member to overtravel the point of complete clutch engagement so as to provide take-up for wear, at least one of said members being adjustable to provide further take-up, said first series of levers being arranged to receive clutch engaging pressure from said operating member, being pivoted on said fulcrum member and each having an inwardly extending arm, said second series of levers being associated, one with each of said first series of levers, each pivoted, intermediate its ends, on said fulcrum member at a point radially outwardly of the pivot of the associated lever of the first series and having an arm extending inwardly and arranged to receive pressure from the associated lever of the first series and an arm extending outwardly and arranged to transmit pressure to the other of said pair of clutch elements.

9. In a friction clutch, a pair of clutch elements and a third clutch element frictionally engageable between said pair of clutch elements, an axially shiftable operating member, and means for transmitting clutch engaging pressure from said operating member to said pair of clutch elements, said means comprising a fulcrum member arranged to transmit pressure to one of said pair of elements, a first and second series of lever members, and resilient means adapted to permit the operating member to overtravel the point of complete clutch engagement so as to provide take-up for wear, at least one of said members being adjustable to provide further take-up, each of said levers of the first series being pivoted, intermediate its ends, on said fulcrum member and having a long arm adapted to receive pressure from said operating member and having a short arm adapted to transmit the pressure to the associated lever of the second series, and each of said levers of the second series having a long arm adapted to receive the pressure from said short arm of the first series and having a short arm adapted to transmit the pressure to the other of said pair of clutch elements.

10. In a friction clutch, a pair of clutch elements and a third clutch element frictionally engageable between said pair of clutch elements, an axially shiftable operating member, and means for transmitting clutch engaging pressure from said operating member to said pair of clutch elements, said means comprising a fulcrum member arranged to transmit pressure to one of said pair of elements, a first and second series of lever members, and resilient means adapted to permit the operating member to overtravel the point of complete clutch engagement so as to provide take-up for wear, at least one of said members being adjustable to provide further take-up, each of said levers of the first series being pivoted on said fulcrum member and arranged to receive clutch engaging pressure from said operationg member, and each of said levers of the second series being pivoted on said fulcrum member and arranged to receive clutch-engaging pressure from the associated lever of the first series and to transmit such pressure to the other of said pair of clutch elements.

11. A clutch as defined in claim 8, wherein the resilient means is interposed between the levers of the first series and the levers of the second series.

12. In a friction clutch, driving and driven clutch elements comprising a pair of clutch elements and a third clutch element frictionally engageable between said pair of clutch elements, an axially shiftable operating member, and means for transmitting clutch engaging pressure from said operating member to said pair of clutch elements, said means comprising a fulcrum member arranged to transmit pressure to one of said pair of elements, a first series of levers each pivoted on said fulcrum member, intermediate its ends, having a long arm extending axially and arranged to receive clutch-operating pressure from said operating member and a short arm extending inwardly and arranged to transmit the pressure, and a second series of levers pivoted on said fulcrum member, outwardly of the pivots of the first series of levers, each associated with a lever of the first series, having a long arm extending inwardly and arranged to receive the clutch-operating pressure from the short arm of the lever of the first series and a short arm extending outwardly and adapted to transmit pressure to the other of said pair of clutch elements, the inwardly extending arms of each pair of associated levers comprising an arm having a pair of spaced arm portions and an arm at least partially embraced between said pair of spaced arm portions.

13. In a friction clutch a pair of clutch elements and a third clutch element frictionally engageable between said pair of clutch elements, an annular axially shiftable operating member, and means for transmitting clutch engaging pressure from said operating member to said pair of clutch elements, said means comprising a fulcrum member arranged to transmit pressure to one of said pair of clutch elements, bell crank levers each having an axially extending arm adapted to receive movement from said operating member and an arm extending generally radially inwardly, said levers being pivoted, at the junctions of said arms, on said fulcrum member, and a second series of levers, one associated with each of said bell crank levers and each pivoted intermediate its ends on said fulcrum member at a point radially outwardly of the pivots of the associated bell crank lever and having a long arm extending inwardly and arranged to receive pressure from the inwardly extending arm of the associated bell crank lever and a short arm extending outwardly and arranged to transmit pressure to the other of said pair of elements.

14. In a friction clutch, a pair of clutch elements and a third clutch element frictionally engageable between said pair of clutch elements, the other of said pair of clutch elements comprising a pressure plate, an axially shiftable operating member, and means for transmitting clutch engaging pressure from said operating member to said pair of clutch elements, said means comprising a fulcrum member arranged to transmit pressure to one of said pair of elements, a first series of levers pivoted on said fulcrum member, arranged to receive clutch-operating pressure from said operating member, and each having an arm extending generally radially inwardly, and a second series of levers, each associated with a lever of the first series, each pivoted, intermediate its ends, on said fulcrum member at a point radially outwardly of the pivot of the associated lever of the first series and each having an arm extending inwardly and arranged to receive pressure from the associated lever and an arm extending outwardly and arranged to bear against said pressure plate to transmit pressure thereto.

15. In a friction clutch, driving and driven clutch elements including a pair of clutch elements and a third clutch element frictionally engageable between said pair of clutch elements, one of said clutch elements including a hub portion having a plurality of axially extending bores, an axially shiftable operating member, and means for transmitting clutch-engaging pressure from said operating member to said pair of clutch elements, comprising a fulcrum member adapted to transmit the pressure to one of said pair of clutch elements, a plurality of operating levers fulcrumed on said fulcrum member and each having one arm arranged to be acted upon by said operating member and another arm extending generally radially inwardly, a plurality of springs and adjustment means operatively interposed in series between said inwardly extending arms and the other clutch element, said springs being mounted in said bores and adapted to transmit clutch-engaging pressure at a substantially fixed maximum while permitting the operating member to overtravel the point of complete clutch engagement, to provide a take-up for wear, and said adjustment means being adapted to provide further adjustment for restoring the overtravel after a substantial reduction thereof though wear has taken place.

RAYMOND A. CARLSON.